THICK MAGNETIC FILM MEMORY DEVICE

Filed Oct. 4, 1965

INVENTORS
RICHARD E. MATICK
CHARLES H. SIE
BY Charles P. Boberg
ATTORNEY

April 1, 1969 R. E. MATICK ET AL 3,436,749

THICK MAGNETIC FILM MEMORY DEVICE

Filed Oct. 4, 1965

Sheet 3 of 4

United States Patent Office 3,436,749
Patented Apr. 1, 1969

3,436,749

THICK MAGNETIC FILM MEMORY DEVICE

Richard E. Matick, Peekskill, and Charles H. Sie, Briarcliff Manor, N.Y., assignors to International Business Machines Corporation, Armonk, N.Y., a corporation of New York Filed Oct. 4, 1965, Ser. No. 492,740
Int. Cl. G11b 5/00
U.S. Cl. 340—174 20 Claims This invention relates to memory systems which employ magnetic films as data storage elements.

For many years there has been a growing interest in the use of magnetic films as digital information storage devices because of the rapidity with which information can be written into or read out of such devices. In some instances, however, there have been factors tending to discourage the use of magnetic films as memory devices, despite their inherently high speed. This is particularly true where it is desired to obtain relatively large output signals from such devices. Larger outputs require the use of films capable of storing higher amounts of energy, and this generally entails the use of magnetic films which are thicker than those customarily employed. It is difficult, if not impossible, to make thick films conform with the close tolerances that are imposed upon the design of magnetic film memory devices in conventionally operated coincident-current memory systems. In memory systems of the nondestructive readout type, where stored information must be repeatedly read out at high speed and occasionally changed, it is especially desirable to employ a memory element that is capable of high-speed operation and adapted to furnish relatively large output signals. There is need for a magnetic film memory scheme which will meet such requirements and which also will enable the stored information to be expeditiously changed as often as needed by coincident-current writing techniques.

Before proceeding further, it will be explained what is meant herein by a "thick" magnetic film. Magnetic films are loosely classified as "thin films" and "thick films," these terms being employed for convenience not only to indicate the thickness of magnetic material but also to signify certain important distinctions between these two types of films. Generally speaking, a thin magnetic film is one in which there is relatively little self-demagnetization or in which the self-demagnetizing field is small enough to be ignored. A thick magnetic film, on the other hand, has a substantial self-demagnetizing field because of the substantial amount of external magnetic flux associated with such a film, this external field tending to demagnetize the film because it has a polarity opposite to that of the internal flux. Whenever the term "thick film" is used herein, it should be understood to mean a magnetic film of the type which has a large self-demagnetizing field, or (stating this another way) it means a film in which the demagnetizing field is large compared with the coercive force of the film, even exceeding the coercive force in some cases.

The self-demagnetizing property of thick magnetic films generally is regarded as a disadvantage because in a conventional type of memory operation this property would render the films highly sensitive to small disturbances and therefore prone to lose their stored information. A memory element which is inherently disturb-sensitive is not suitable for use in a conventional coincident-current writing scheme because there it will be subjected to many disturbances which it cannot resist. Before thick films can be used in a type of memory system which utilizes a coincident-current writing technique for entering new information into the memory array, a mode of operation must be devised whereby the inherent self-demagnetizing fields of these thick films will have no detrimental effect upon the writing, storing and reading functions of the system. Moreover, the magnitudes of the currents required for such writing operations must not be excessive and the thick films must not be subjected to close tolerances in their mechanical and magnetic properties. In prior memory systems it has not been possible to fulfill these requirements.

An object of the present invention is to provide a read-write type of magnetic film memory which can utilize thick film memory elements without suffering the disadvantages heretofore attributed to such elements.

Another object is to provide an improved read-write magnetic film memory which is adapted to utilize magnetic films capable of storing relatively high energy and having wide tolerances as to their magnetic and mechanical properties.

A further object is to provide a nondestructive readout memory with coincident-current writing facilities which is adapted to utilize thick magnetic film storage devices in such a way that the large self-demagnetizing fields of said devices are advantageously employed to enhance, rather than detract from, the stability of these devices.

Still another object is to provide an improved thick film memory device having novel writing and reading techniques whereby significant changes of state can be made to occur during both writing and reading phases of the operation without requiring that the device execute a major hysteresis loop or undergo any disturbance greater than a minor hysteresis-loop excursion of its magnetic state, thus enabling the device to function at very high speed with relatively low writing and reading currents and with relatively high output signals.

To illustrate the various features of the invention, there is disclosed herein a nondestructive readout memory system in which each bit storage device comprises a pair of relatively thick, anisotropic, magnetic films arranged in contact with or closely adjacent to each other and having their respective "easy axes" disposed at right angles. One film of each pair is herein designated the "storage film," and the other film of the pair is designated the "read film," the reasons for these designations becoming apparent presently. The storage film inherently has a large self-demagnetizing field in order to provide a suitable magnetic bias for the read film, the "hard axis" of which is disposed in the flux return path of the storage film.

To render these storage devices suitable for use in a coincident-current writing scheme, a novel mode of operation has been devised for that purpose. Thus, where a bit storage device its to store a given binary digit, such a "0," the storage film is magnetized to saturation along its easy axis, but where the other binary digit (for example, "1") is to be stored, the storage film is partially or wholly demagnetized. During readout the device is momentarily pulsed toward its saturated or "0" state. If it already is in that state, there is no disturbance of the device and no output signal therefrom. If the device is in a demagnetized or partially demagnetized "1" state, the self-demagnetizing field of the storage film and its inherent reluctance to domain-wall motion will prevent this film from becoming saturated in response to a read pulse or a half-select write pulse. Insofar as the read film is concerned, however, a read pulse causes a substantial change in the hard-axis magnetization of the read film when the same is in its "1" state, because here the applied field acts upon the read film transversely, i.e., by rotation of the magnetic moments rather than domain-wall motion, and the readout signal is quite large because of the high energy-storing capability of a thick read film.

The operating tolerances in this type of system are sufficiently great so that the stored "1" state can exist anywhere throughout a wide range of partial magnetization levels, not being restricted necessarily to a completely demagnetized state of the film. It has been determined experimentally that even at a fairly substantial level of partial magnetization representative of stored "1," the storage film attains high stability with respect to half-select writing or non-destructive readout pulses that may be applied to it, and it can withstand an infinite number of such disturbances without losing its stored information. Only a full-select field will bring the storage film into its "0" state. With the proper choice of film parameters, as hereinafter described, the desired advantages can be achieved while using reasonably small read and write currents.

The foregoing and other objects, features and advantages of the invention will be apparent from the following more particular description of a preferred embodiment of the invention, as illustrated in the accompanying drawings.

Figure 1:
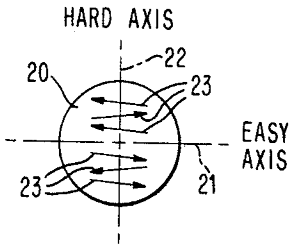
FIG. 1 is a diagrammatic showing of an anisotropic, flat, magnetic film memory element in its demagnetized state, with the magnetic moments thereof in an anti-parallel condition.

Referring now to FIG. 1, the magnetic film 20 shown therein is assumed to be a flat, anisotropic, thick film having a preferred easy axis of magnetization 21 and transverse thereto a hard axis of magnetization 22. When the film 20 is in its demagnetized state, as represented in FIG. 1, the various magnetic moments 23 in this film are in a split-up, anti-parallel state, with approximately one-half of the moments 23 pointing in one direction along the easy axis 21 and the other half of the moments 23 pointing in the opposite direction along said axis 21. (No attempt has been made herein to show the wall of the various domains within which these moments are contained.) The various directions in which the moments 23 point may not be strictly parallel in any particular demagnetized condition of the film 20, but on the average these moments are oriented parallel with the easy axis 21, with approximately equal numbers of the moments 23 pointing in substantially opposite directions so that the net magnetization of the film 20 is substantially zero under these circumstances.

The demagnetized state of the film 20 represented in FIG. 1 is one of the stable states of this film. Magnetic fields applied along the axis 21 will not appreciably disturb the demagnetized state of the film 20 unless such applied fields reach a magnitude sufficient to reverse the positions of the opposing moments 23, either by domain-wall motion or by incoherent rotation of the moments through nearly 180°, as the case may be. Moreover, as will be seen subsequently herein, the self-demagnetizing field of the film also tends to resist such a change, this being, in fact, an important aspect of the present invention. In any event, a substantial amount of energy is required to bring the film 20 out of its demagnetized state if the applied field is directed along its easy axis 21.

Figure 2:
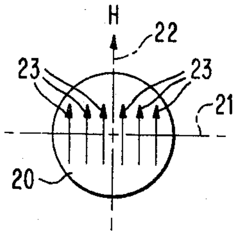
FIG. 2 is a diagrammatic showing of the same memory element while in a state of magnetic saturation with its moments pointing parallel to the hard axis.

On the other hand, the magnetic state of the film 20 can readily be changed by applying to it a relatively small magnetic field directed along its hard axis 22. Thus, referring to FIG. 2, a field H of appropriate magnitude applied along the hard axis 22 of the film 20 will tend to bring the moments 23 of this film toward or into parallel relationship with the hard axis 22. This occurs through incoherent rotation of the moments 23 away from the easy axis 21 under the influence of the transverse field H. Relatively little energy is required to rotate a moment through an angle approximating 90°, as compared with the energy required to reverse the moment either by inducing linear domain-wall motion (without rotation) or by rotating the moment through substantially 180° without the aid of a transverse field. FIG. 2 depicts a plurality of the parallel moments 23 in order to be consistent with FIG. 1, but customarily such a condition is viewed as though all of these moments were combined in a single domain, which is represented by a single arrow. The present showing is somewhat unconventional in this regard. If, after the magnetic moments 23 of the film 20 have been rotated into the hard-axis direction of this film, as indicated in FIG. 2, the magnetizing field H then is withdrawn, the moments 23 will tend to rotate in random fashion into the anti-parallel state thereof illustrated in FIG. 1, thereby demagnetizing the film.

The film 20 can be magnetized to saturation in one direction or the other along the easy axis 21 by applying thereto a magnetizing field paralleling the easy axis 21 and of sufficient strength to reverse the polarity of those moments 23, FIG. 1, which oppose this field. This type of operation is known as "parallel-mode switching," and it is employed herein to change the digital information stored in a magnetic storage film. It is possible also to re-orient the moments by what is known as "orthogonal-mode switching," although this particular technique is not employed in the present instance.

Figure 3:
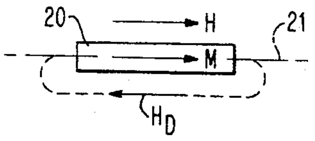
FIG. 3 is a diagrammatic edge view of said element when it is magnetized in a given direction along its easy axis.

Let it be assumed that a very strong magnetic field H, FIG. 3, is applied to the film 20 along its easy axis 21, toward the right as viewed in FIGS. 1 and 3. While this field H is being applied, the film 20 assumes or is maintained in a state of magnetic saturation, with its magnetization vector M, FIG. 3, pointing in the same direction as the applied field H. Upon removal of this field H, the film 20 will remain in a state of at least partial saturation, with some of its moments still oriented in the direction of the vector M due to the remanent properties of such a film. The magnetic flux which escapes the film and eventually returns thereto sets up a self-demagnetizing field, represented by the vector $H_D$ in FIG. 3, opposing the remanent magnetization vector M. This causes the hysteresis loop of the film, FIG. 4, to deviate from a rectangular shape as indicated.

Figure 4:
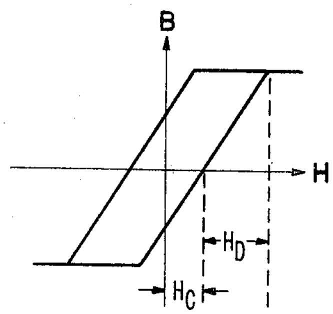
FIG. 4 is a magnetization characteristic, taken along the easy axis of an anisotropic, flat, thick film suitable for use in the present invention.

In the graphical representation (FIG. 4), B represents magnetic flux density and H represents magnetizing field. In the case of a thin film, the hysteresis loop may approximate a rectangular shape, since there is only a small self-demagnetizing field due to the small amount of magnetic flux from such a film. In the case of a thick film, however, the sides of the hysteresis loop are slanted or "sheared," as shown in FIG. 4, the slant of the hysteresis loop being a measure of the self-demagnetizing field of the film. With a film of substantial thickness (for example, a circular film having a diameter of $\frac{1}{32}$ inch and a thickness of 3,000 A.) the self-demagnetizing effect is very pronounced.

As already indicated in connection with FIG. 3, the external magnetic flux from a thick film 20 produces a self-demagnetizing field $H_D$ which opposes the remanent magnetization vector M of the film. Referring to FIG. 4, the self-demagnetizing field $H_D$ is equal to the difference between the total field required to saturate the film and the coercive force $H_C$ of that film, the coercive force $H_C$ being that value of applied magnetic field at which the magnetic polarity of the film changes. In the case of thick films of the type contemplated for use in the present invention, the self-demagnetizing field $H_D$ of an individual film may well exceed the coercive force $H_C$, although this is not a necessary condition for a thick film. Again referring to FIG. 3, the fact that the film is thick means that the amount of flux traveling through the air return path (indicated by the dashed loop containing the arrow $H_D$) is relatively large.

Figure 5:
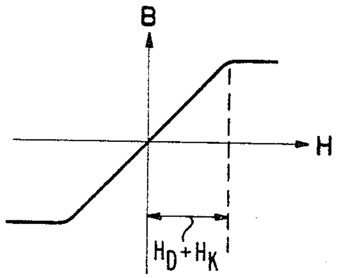
FIG. 5 is the hard-axis magnetization characteristic of such a film.

It has been explained hereinabove that the application of a strong transverse field along the hard axis 22 of the film 20, as indicated in FIG. 2, will cause the magnetic moments 23 to be rotated into the hard-axis direction. The film 20 has a hard-axis magnetization characteristic, FIG. 5, considerably different than its easy-axis characteristic shown in FIG. 4. As shown in FIG. 5 (where B represents flux density and H represents the applied magnetizing force), there is little or no remanence in the film along its hard axis, and the hysteresis characteristic is essentially a slanted straight line terminating at its upper and lower ends, respectively, in positive and negative magnetic saturation levels. In order to plate the film in a state of magnetic saturation along its hard axis, the applied field must equal the sum of two values, one of which is the self-demagnetizing field $H_D$, of the film, and the other being what is known as the "anisotropy" field $H_K$. The anisotropy field $H_K$ represents the amount of magnetizing force that would be needed merely to rotate the magnetic moments 23 from their positions along the easy axis 21 to positions paralleling the hard axis 22, FIG. 2, if the self-demagnetizing field were zero, as in the case of a thin film. The self-demagnetizing field $H_D$ represents the extent to which the moments tend to position themselves in an anti-parallel, demagnetized state in preference to a parallel, magnetized state.

Figure 6:
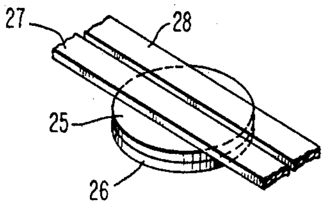
FIG. 6 is a perspective view schematically representing a pair of flat, thick films arranged in association with drive and sense conductors according to the principles of the invention.

A very elementary model of a magnetic film storage device designed for nondestructive readout in accordance with the principles of the invention is shown in FIG. 6.

This device includes a pair of thick, flat, magnetic films 25 and 26, herein assumed to have a circular shape, which are positioned in superposed relationship with their adjoining planar faces in contact. Disposed adjacent the pair of films 25 and 26, in inductive relationship thereto, are a drive conductor 27 and a sense conductor 28, which are parallel with each other. (In practice, the sense conductor 28 also serves as a bit current conductor, and the conductor 27 would be a word current conductor, in order to provide coincident currents for writing operations as described hereinafter.) The films 25 and 26 are made of appropriate magnetic materials which are deposited by a suitable deposition method upon a supporting substrate or substrates (not shown). The film 25 is herein referred to as a "storage film," while the film 26 is herein designated a "read film," these terms designating functions respectively performed by the two films in nondestructive readout operations. While they are represented in the drawings as being of equal thickness, the films 25 and 26 may differ in thickness according to practical design considerations. Neither of these films is sufficiently thin to be classed as a "thin film" in the generally accepted sense of that term. The storage film 25 is preferably (although not necessarily) anisotropic. The read film 26 is anisotropic, having a single preferred axis of magnetization, as will be explained presently.

Figure 7:
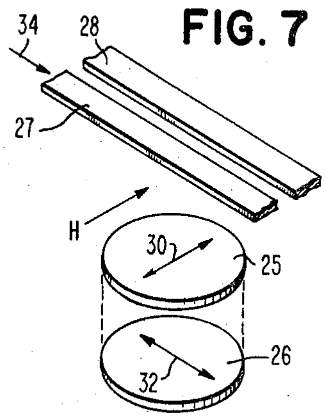
FIG. 7 is an exploded perspective view of the device shown in FIG. 6, indicating the manner in which the easy axes of the two films are oriented.

The drive conductor 27, which in practice would be the conductor for the word currnets, preferably is made approximately as wide as the films 25 and 26 (although it is not shown that wide in FIG. 6), and it can be a deposited conductive strip. The sense conductor 28, which in practice may serve also as a bit current conductor, actually would be in superposed relationship to the drive conductor, and it may be either a deposited conductor or a wire conductor. FIG. 7 is an exploded view of the elements shown in FIG. 6. The storage film 25 has a preferred "easy" axis of magnetization 30 which extends transversely of the conductors 27 and 28. It also has a "hard" axis (not indicated) which extends parallel to the conductors 27 and 28. The read film 26 has a preferred easy axis 32 positioned in orthogonal relationship to the easy axis 30 of the film 25, and the transverse hard axis (not indicated) of the film 26 parallels the easy axis 30 of the film 25.

Figure 8:
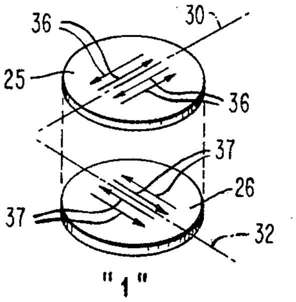
FIG. 8 is a diagrammatic, exploded perspective view representing the condition of the films in the demagnetized state of the memory device.
Figure 9:
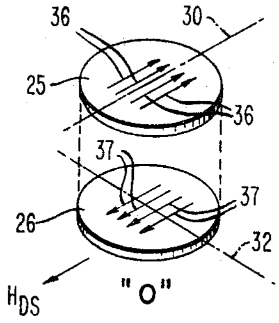
FIG. 9 is a similar view representing the condition of the films in a fully magnetized state of the memory device.

One possible way to magnetize the storage film 25 is to send a strong pulse of driving current through the drive conductor 27, in the direction of the arrow 34, for example, thereby producing a magnetizing field H as indicated by the arrow bearing this designation in FIG. 7, the field H being directed along the easy axis 30 of the storage film 25. Assuming that the magnetic moments 36 of the film 25 originally are in their demagnetized state as represented in FIG. 8, the application thereto of the magnetizing field H, FIG. 7, will cause the moments 36 of the film 25 now to become oriented in the same direction along the easy axis 30, as indicated in FIG. 9 (which represents the individual moments rather than their effective single domain). As will be explained presently, most of these moments will continue to occupy such a position after the applied magnetizing field is withdrawn. The storage film 25 then is said to be in a state of remanent magnetization (FIG. 9), in which state it tends to remain until sufficiently disturbed at some later time.

The read film 26 has magnetic moments 37, FIG. 8, which occupy anti-parallel positions on the easy axis 32 when film 26 is in its demagnetized state as shown in FIG. 8. This may occur when storage film 25 is demagnetized. When the film 25 is in a state of extreme remanent magnetization as indicated in FIG. 9 the moments 37 of film 26 will become positioned along the hard axis of the film 26, pointing in a direction opposite to that in which the moments 36 of the storage film 25 point.

Figure 17:
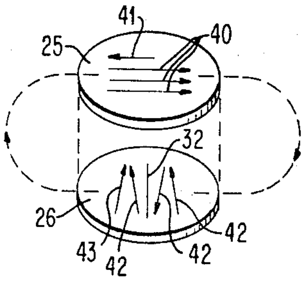
FIG. 17 is a schematic representation of the two films in a state of partial magnetization.

It is possible also to have the storage film in a state of partial magnetization or partial demagnetization (these two terms being equivalent), as indicated in FIG. 17. Here it is assumed that most of the moments in the film 25 are pointing to the right along the easy axis of the film 25, as indicated by the arrows 40, FIG. 17, with a smaller number of moments pointing in the opposite direction, as indicated by the arrow 41. Since all of the moments are not oriented alike, the self-demagnetizing field of the storage film 25 is correspondingly weakened, and this may cause the moments of the read film 25 to occupy angular positions intermediate the easy axis 32 of the read film 26 and the transverse hard axis of this film, as indicated by the slanted arrows 42 and 43, FIG. 17. This, too, can be a useful information-representing state of the device, as will be seen presently.

It was explained hereinabove, in connection with the single-film magnetic storage device shown in FIGS. 1–3, that when a thick magnetic film is in a state of remanent magnetization, it has a substantial self-demagnetizing field which is manifested by the presence of flux that leaves the film at one edge thereof and re-enters the film at the opposite edge thereof, as indicated by the arrow in $H_D$, in FIG. 3. To recapitulate, where two such films are positioned together in face-to-face relationship, as are the films 25 and 26 shown in FIG. 6, the self-demagnetizing field of the storage film 25, hereinafter designated the field $H_{DS}$, acts upon the adjoining read film 26, as indicated in FIG. 9, tending to magnetize the film 26 in the direction of the field $H_{DS}$. Because of the manner in which the easy axes 30 and 32 of the films 25 and 26 are oriented with respect to each other, the field $H_{DS}$ is transverse to the easy axis 32 and parallels the hard axis of the film 26. The film parameters are so chosen that the self-demagnetizing field $H_{DS}$ of the storage film 25 (when said film is saturated) is sufficiently strong to saturate the read film 26 along its hard axis. Since a self-demagnetizing field opposes its remanent magnetization vector, the field $H_{DS}$ orients the moments 37 of the film 26 opposite to the direction of the moments 36 of the storage film 25, in this condition of the device.

A demagnetized state of the storage and read films 25 and 26 as depicted in FIG. 8, or a partially demagnetized state thereof as indicated in FIG. 17, is herein considered to represent a stored binary "1." An extreme remanent state of the storage film 25 accompanied by hard-axis saturation of the read film 26, as depicted in FIG. 9, is considered to represent a stored binary "0." The flux polarity is immaterial, since either one of the extreme remanent states can represent zero. The terms "one" and "zero" are employed merely for convenience herein to denote different digital values, and the assignments of digital values to the respective magnetic states of the film are arbitrarily chosen. It is required merely that the magnetic states representing the respective digits be stable and readily distinguishable from each other under practical operating conditions, whatever the exact conditions of magnetization or demagnetization representing them may happen to be.

Figure 10:
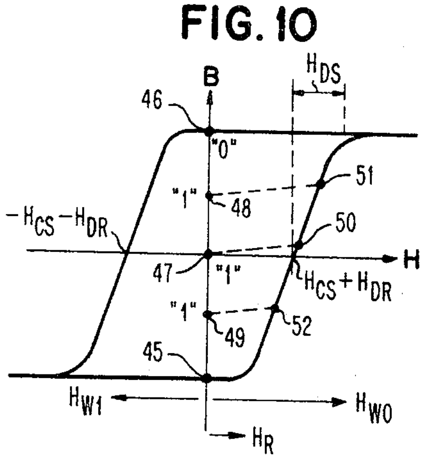
FIG. 10 is a magnetization characteristic of a thick storage film when it is coupled to a thick read film according to the invention.
Figure 18:
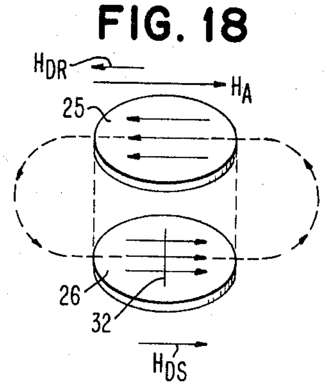
FIG. 18 is a schematic representation of the films showing the relationship of the applied and self-demagnetizing fields when the storage film is about to be switched away from an extreme remanent state.

It was mentioned hereinabove that FIG. 4 represents the easy-axis magnetization characteristic or B–H loop of a flat, thick film of the type contemplated herein when it is functioning as an isolated storage device. In such a film the self-demagnetizing field $H_D$ may exceed the coercive force $H_C$ of the film as indicated in FIG. 4, particularly where a practical limit is imposed upon the magnitude of $H_C$ by design considerations such as the desire to minimize writing currents. When a storage film 25 of this type is magnetically coupled with another thick film (read film 26), however, as in the manner depicted by FIGS. 6–9, its magnetization characteristic is modified by the presence of the self-demagnetizing field $H_{DR}$ of the read film, which opposes the self-demagnetizing field $H_{DS}$ of the storage film as indicated in FIG. 18, giving an apparent B–H loop of the type shown in FIG. 10 for the storage film 25. The coercive force of the storage film 25 now has an apparent value equal to the true value of the coercive force $H_{CS}$ plus the demagnetizing field $H_{DR}$ of the read film 26, as indicated in FIG. 10. These conditions are necessary for the proper functioning of the device.

Figure 11:
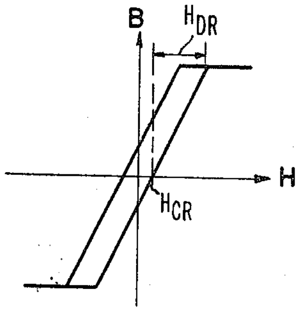
FIG. 11 is the easy-axis magnetization characteristic of the read film in said device.
Figure 13:
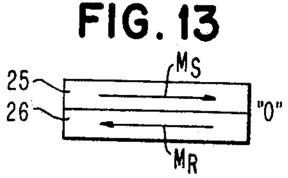
FIG. 13 is a diagramatic edge view representing one of the magnetic states of the film pair when it is storing a binary "0."
Figure 12:
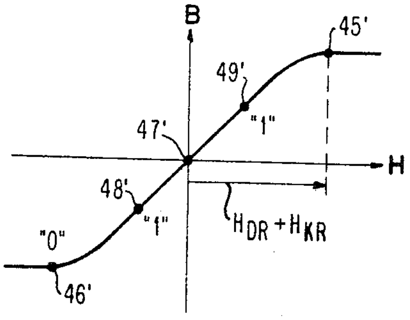
FIG. 12 is the hard-axis magnetization characteristic of the read film.

The read film 26, FIGS. 6–9, has an easy-axis magnetization characteristic as shown in FIG. 11 and a hard-axis magnetization characteristic as shown in FIG. 12. The self-demagnetizing field $H_{DR}$ of the read film is large compared with the corecive force $H_{CR}$ of this film, and it may exceed said coercive force as indicated in FIG. 11. The easy-axis characteristic of the read film 26 is mostly of academic interest inasmuch as the film 26 is not switched along its easy axis in the present system. The hard-axis characteristic of the read film 26 shown in FIG. 12 is more directly involved in the present mode of operation. On this axis the flux density B varies in an essentially linear manner with respect to the applied magnetizing force H until the film 26 reaches saturation, which occurs when the applied magnetizing force is equal to the sum of $H_{DR}$ (the self-demagnetizing field of read film 26) and $H_{KR}$ (the anisotropy field of read film 26). For optimum conditions the sum $H_{DR}+H_{KR}$ is made substantially equal to the self-demagnetizing field $H_{DS}$ of the storage film 25, so that the self-demagnetizing field of storage film 25 maintains the read film 26 saturated along its hard axis when the storage film 25 is in a "zero" state of limiting remanent magnetization (FIG. 9).

The operation of storing a binary "1" or "0" in a two-film memory cell of the type shown in FIGS. 6–9 will be explained in an elementary way with reference to FIGS. 10–14 of the drawings. A more detailed analysis will be presented subsequently herein. Refering to FIG. 10, which represents the effective magnetization characteristic of the storage film 25 when it is magnetically coupled to a read film 26, a "0" may be stored at either of the extreme remanent states of the storage film, indicated by the points 45 and 46, respectively, in FIG. 10. When a "1" is to be stored, the storage film is either completely demagnetized as indicated by point 47 or is partially demagnetized as indicated by points such as 48 and 49 in FIG. 10. By experimentation, it has been ascertained that "1" can be effectively stored when the remanent magnetization is a high percentage of the remanent magnetization level representing a stored "0." (Fifty percent would not be unreasonable.) This state of partial magnetization (or demagnetization) representative of a stored "1" will be maintained despite the repeated application of half-select write and nondestructive read pulses to the memory cell. The corresponding points on the hard-axis characteristic of the read film, FIG. 12, are indicated by the reference numbers 45' and 46' for stored "0" and the reference numbers 47', 48' and 49' for stored "1." In this connection it should be observed that the magnetic polarity of the read film is opposed to that of the storage film, inasmuch as the read film serves as the return path for the demagnetization flux from the storage film, as indicated in FIGS. 9–13.

Figure 14:
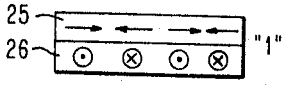
FIG. 14 is a diagrammatic edge view representing, in a schematic fashion, one of the magnetic states of the film pair when it is storing a binary "1."

FIGS. 8 and 14 represent a completely demagnetized state of the storage and read films 25 and 26, while FIG. 17 depicts in schematic fashion a partially demagnetized state of these films. Any of these demagnetized or partially demagnetized states can represent a stored "1" as explained hereinabove. With respect to FIG. 14, the showing therein is completely symbolic and does not purport to represent the actual conditions of the moments in the storage film 25.

In the mode of operation which is assumed herein for the purpose of explaining this invention, all storage devices initially are preset to a demagnetized or partially demagnetized state representative of "1." A preset or "write 1" field is indicated by the arrow $H_{W1}$ in FIG. 10. If a "0" is to be stored, the device is set to its "0" state by coincident word and bit fields, the sum of which is indicated by the vector $H_{W0}$ in FIG. 10. When stored information is to be read out of the device, a read current pulse, which produces the small read field $H_R$ in FIG. 10, is applied thereto in the "0" direction. This read field has a negligible effect upon the storage film 25, whether this film is storing a "0" or a "1." At most, it could only cause the storage film to execute a minor hysteresis loop. However, as will be explained more fully hereinafter, the read field will significantly affect the read film 26 if said film is storing a "1," thereby causing a readout signal to be produced. (It is possible to operate also with a read field of polarity opposite to that of $H_R$ as shown, but such operation will not be considered herein.)

Half-select write pulses of sufficient magnitude may cause the storage film to execute a minor hysteresis loop when it is in its "1" state, as indicated approximately by any of the dashed lines 47–50, 48–51 and 49–52 in FIG. 10. Experimental observations indicate that these small excursions involve very little flux variation, hence do not affect the stability of the device nor produce any spurious outputs. With the polarities of the applied fields being as shown in FIG. 10, the line 48–51 represents the limiting partial magnetization level which will be attained by the storage film as a result of half-select write and read disturbances. Such disturbances cannot magnetize the storage film above the indicated level because the self-demagnetizing field of the storage film then becomes so great as effectively to prevent any greater magnetization in response to an applied field of such limited strength. Furthermore, it is inherently difficult to switch a film by domain-wall motion and the switching of the storage film 25 occurs primarily in that manner under the present arrangement. Only a full-select write pulse, represented by the arrow $H_{W0}$ in FIG. 10, is effective to bring the storage film from its "1" state into its "0" state.

Figure 15:
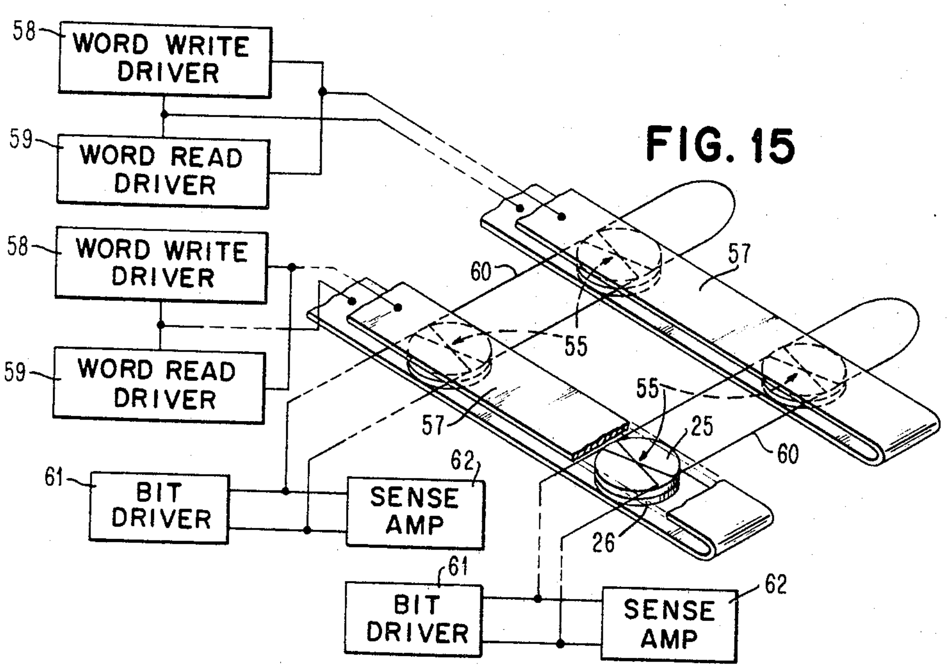
FIG. 15 is a diagrammatic perspective view representing, in a schematic way, a portion of a two-dimensional memory array constructed in accordance with the principles of the invention.

FIG. 15 represents in simplified form a small portion of a magnetic storage cell array constructed in accordance with the invention. Each storage cell 55 comprises a storage film 25 and read film 26 arranged in superposed relationship as described hereinabove. The word conductors 57 are represented in FIG. 15 as being in the form of looped strips having substantially the same width as the films 25 and 26. Each storage cell 55 is sandwiched between the upper and lower portions of a word conductor loop 57. If a conductive ground plane is employed as the substrate supporting the storage films 55, it may serve as the common return path of the various word conductors. Word write drivers 58 and word read drivers 59 are associated with the respective word lines 57. (FIG. 15 is only a schematic showing and does not represent actual circuit connections.) Each of the drivers 58 is adapted to supply a half-select write current pulse to its word line 57.

Bit current conductors 60 are associated with the memory cells 55 extending in a generally orthogonal relation to the word current conductors 57. The conductors 60 also serve as the sense lines of the array. A bit driver 61 and a sense amplifier 62 are associated with each bit-sense line 60, the connections being only schematically represented in FIG. 15. As shown best in FIG. 16, the forward and return wires of each bit-sense conductor 60 preferably are crossed in figure-8 fashion adjacent to each of the memory cells 55 to provide a two-turn inductive coupling linked by part of the external magnetic flux extending parallel to the easy axis 30 of the respective storage film 25.

Figure 16:
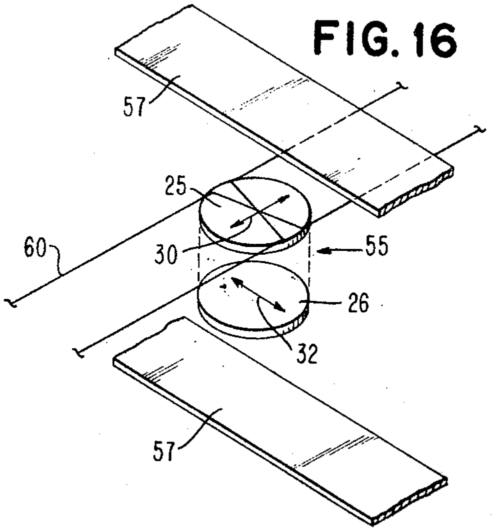
FIG. 16 is an exploded view of a portion of the apparatus shown in FIG. 15.

The word conductors 57 likewise are inductively coupled, with the same orientation, to the associated storage films 25, as shown in FIG. 16, so that the bit and word lines 60 and 57, respectively, can apply parallel half-select magnetizing fields to each of their associated memory cells 55. During a readout operation, sensing is effected along the easy axis 30 of each storage film 25, that is, along the hard axis 32 of each associated read film 26 in the active word line. The output signal furnished by a sense line 60 is the voltage induced in this line by a change in that portion of the magnetic flux which is external to both of the films 25 and 26 and which links the crossed wires of the conductor 60. The word write drivers 58 are bipolar in order that they may apply presetting pulses to their respective word lines 57 as needed. The preferred mode of operation (although not the only feasible one) is such that the memory cells 55 of an entire word line are preset to their "1" states by a suitable current pulse in a world line only, each time it is desired to change the information stored in any of the cells in that line, and new information is then written into the cells in such fashion that a "0" is stored wherever there is a coincidence of word write and bit write currents.

Figures 19, 20:
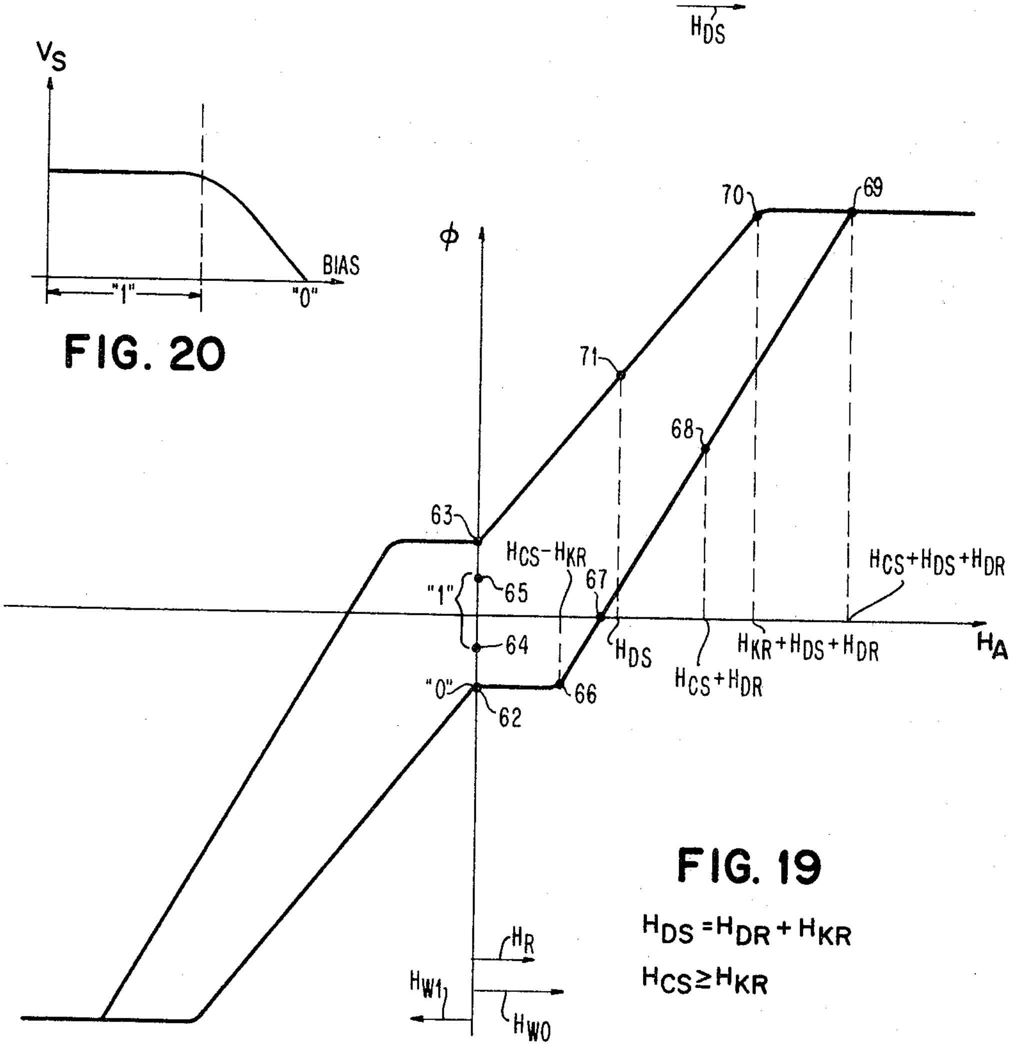
FIG. 19 is a graphical representation of the relationship between the net flux in both films and the magnetizing field applied thereto, under certain assumed conditions of operation.
FIG. 20 is a graphical representation showing the manner in which the output signal varies with the amount of magnetic bias imparted by the storage film to the read film, for a given read current.

FIG. 19 is a graph of the relationship between the applied field $H_A$ and the net flux $\phi$ in both films of a memory cell while a changing field is being applied thereto, under certain assumed optimum conditions of operation. Each point on the graph represents the total reversible and irreversible net flux that exists in response to the instantaneous value of the applied field. By "net flux" is meant the algebraic total of the flux available from both films. For example, in FIG. 13 the net flux will be that which is represented by the difference between the opposed magnetization vectors $M_S$ and $M_R$ in the storage and read films 25 and 26, respectively. FIG. 19 is concerned only with conditions as they exist either during the application of a low-frequency, alternating-current drive field or else during a quiescent state (zero H) when no field is being applied.

Referring again to FIG. 19, it is assumed herein that the self-demagnetizing field $H_{DS}$ of the storage film 25 is equal to the sum of the self-demagnetizing field $H_{DR}$ and the anisotropy field $H_{KR}$ of the read film, so that the read film 26 is just saturated along its hard axis by the self-demagnetizing field of the storage film 25 when the latter is storing "0." The coercive force $H_{CS}$ of the storage film is equal to or greater than the anisotropy field $H_{KR}$ of the read film. The stored "0" condition may be represented by either the point 62 or the point 63 in FIG. 19. A stored "1" condition may be anywhere between the points 64 and 65 and can be reached only by traversing minor loops which are not shown. The arrows marked $H_{W0}$, $H_{W1}$ and $H_R$ in FIG. 19 merely indicate the relative polarities of these applied fields. All of these polarities could be reversed, depending upon the portion of the characteristic on which the device is operating.

For the present it will be assumed that the negative saturation state of the storage film at point 62 represents "0." The read film is positively saturated at this time. Between the points 62 and 66 in FIG. 19, while $H_A$ is being increased, the storage film is in its "0" state and effectively resisting any change in that state, until at point 66 the applied field becomes equal to the value $H_{CS}-H_{KR}$, herein assumed to be greater than zero. At point 66, under the assumed conditions the storage film starts to switch away from its negative saturation state toward its positive saturation state (by domain-wall motion) inasmuch as the coercive force of the storage film then will have been effectively overcome by the algebraic total of all of the field acting upon it which occurs when $H_A$ exceeds $H_{CS}-H_{KR}$. Further increase of the applied field causes the net flux $\phi$ in the two films to switch from a resultant negative polarity to a resultant positive polarity at the point 67 FIG. 19 following which the flux $\phi$ increases in substantially linear fashion toward the upper saturation level of the two films. The flux in the storage film itself is still negative at this point however.

At point 68 the storage film becomes completely demagnetized while the read film is still saturated by the applied field $H_A$, which now is equal to $H_{CS}+H_{DR}$. Further increase in the value of applied field $H_A$ eventually brings both films into a state of positive saturation at point 69, FIG. 19, at which time the applied field is equal to the sum of $H_{CS}+H_{DS}+H_{DR}$. From this point on, any further increase in applied field $H_A$ will produce no corresponding increase in the total flux $\phi$.

After both films have reached positive saturation, if the applied field $H_A$ now is progressively diminished, the saturation state of both films prevails until point 70, after which the applied field no longer is able to maintain the read film in a state of positive saturation against the self-demagnetizing action of the positively saturated storage film. The change occurs when $H_A$ becomes less than the sum of $H_{KR}+H_{DS}+H_{DR}$. Reduction in the value of $H_A$ now permits the magnetic moments of the read film to start rotating back toward the easy axis of this film (which is at right angles to the applied field). At point 71, FIG. 19, the read film is completely demagnetized by $H_{DS}$, which now is exactly equal to the applied field $H_A$. Further reduction of $H_A$ enables the self-demagnetizing field $H_{DS}$ to predominate, so that at point 63, when $H_A$ is zero, the magnetization of the read film is completely reversed by the field $H_{DS}$ of the storage film. The memory cell now is in its other "0" state, with the storage film positively saturated along its easy axis and the read film negatively saturated along its hard axis.

The analysis can be carried further for the negative values of $H_A$, but inasmuch as this operation would merely be the converse of the operation just described, it will not be explained herein. The behavior of the memory cell for negative values of $H_A$ is represented graphically in the left half of FIG. 19.

Referring again to FIG. 19, the stored "1" state in the partial magnetization or demagnetization range 64–65 is not critical in the mode of operation described hereinabove. As previously explained, half-select write pulses will not seriously disturb the partially magnetized state of the storage film because (1) the storage film can be switched only by domain-wall motion, which it inherently tends to resist, and (2) the self-demagnetizing field of the storage film (which opposes the disturbing field) will not permit domain-wall motion to occur above a certain limiting level of partial magnetization in response to such half-select disturbances. Only a full-select write field will overcome this self-stabilizing tendency of the storage film when it is partially magnetized or demagnetized. On the other hand, a preset pulse, which produces a field in the same direction as the self-demagnetizing field of the storage film, is effective to change the state of said film from "0" to "1" even though the present field is not of the same magnitude as a full-select field.

An important feature of the present invention is the wide tolerance range of the magnetic film storage elements. Referring to FIG. 20, it has been found experimentally that the output signal or sense voltage $V_S$ remains fairly constant for a given small read current amplitude throughout the entire range of partial magnetization levels to which the read film may be biased for storing a "1." This means that the circuitry associated with the memory array can be designed for a predetermined strength of output signal regardless of where the stored "1" state happens to fall within the range of stable partial magnetization levels representing the digit "1." Hence, the storage and read films are not subjected to close tolerances insofar as their magnetic properties are concerned. This is a great advantage in designing a magnetic film memory.

Although the disclosed memory system is designed primarily for rapidly reading stored information in a nondestructive fashion, it also is adapted to perform reasonably high-speed writing whenever new information is to be entered into storage. Write cycle times in the range of a few microseconds can be achieved with this design, which compares favorably with the writing speeds of other magnetic film memories that do not have some of the important advantages, such as high output signals and loose tolerances, afforded by the present system. Low read currents can be used because the read film is driven and sensed transversely, along its hard axis. Readout times are negligible when compared with other unavoidable peripheral factors, such as inherent delays in the reading circuitry, so that the reading out of information from the memory device itself can be regarded as occurring practically instantaneously.

Write currents can be kept reasonably low by the proper choice of film parameters, particularly by choosing a low coercive force of the storage film, because by utilizing the principles of the invention, it is not necessary to have a high coercive force. The self-demagnetizing field of this film helps to maintain stability of the device when it is in its partially magnetized or demagnetized "1" state. There is no stability problem whatsoever when the film is in its "0" state, in view of the manner in which the memory devices are pulsed during all operations other than a presetting operation. It is important to note that the self-demagnetizing field $H_{DS}$ of the storage film actually can exceed the coercive force $H_{CS}$ of this film without affecting the ability of the device to store a "0," due to the influence of the read film upon the storage film as already noted. This enables one to select a low value of $H_{CS}$ for minimizing the write currents as just mentioned.

Although the storage film 25 has been described herein as having uniaxial anisotropy, it would be possible, through a proper choice of film and circuit parameters, to utilize an isotropic storage film for this purpose. Hence, the invention is not limited to having uniaxial anisotropy in both films.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic memory device comprising:

a first magnetic film exhibiting a coercive force along at least one axis thereof and having a self-demagnetizing field large in comparison with said coercive force, a second magnetic film having a preferred axis of magnetization disposed in substantially transverse relation to said first film axis, said second film having a self-demagnetizing field, each of said films being positioned in the self-demagnetizing field of the other film, and electrical input-output means inductively coupled to said films including energizing means for applying to said films selected magnetizing fields in a direction substantially parallel with said first film axis, and sensing means for producing electrical signals in response to variations in the magnetic flux external to both of said films.

2. A memory device as set forth in claim 1 wherein the self-demagnetizing field of said first film exceeds the self-demagnetizing field of said second film, and the coercive force of said first film is at least substantially equal to the difference between said self-demagnetizing fields.

3. A memory device as set forth in claim 2 wherein the self-demagnetizing field of at least the first one of said two films exceeds the coercive force of that film.

4. A memory device as set forth in claim 2 wherein said second film exhiibts an anisotropy field along a hard axis thereof which is transverse to said preferred axis, the difference between said self-demagnetizing fields being at least substantially equal to said anisotropy field.

5. A memory device as set forth in claim 4 wherein the self-demagnetizing field of at least the first one of said two films exceeds the coercive force of that film.

6. A magnetic memory device comprising:

a first anisotropic magnetic film having a preferred axis of magnetization along which it exhibits a coercive force and having a self-demagnetizing field large in comparison with its coercive force, a second anisotropic magnetic film having a preferred axis magnetization and having a second axis of magnetization transverse to its preferred axis along which said second film exhibits an anisotropy field, said second film having a self-demagnetizing field smaller than the self-demagnetizing field of said first film, each of said first and second films being positioned in the self-demagnetizing field of the other film, with its preferred axis transverse to the preferred axis of the other film, the difference between the respective self-demagnetizing fields of said two films being not greater than the coercive force of said first film and not less than the anisotropy field of said second film, and electrical input-output means inductively coupled to said films including energizing means for applying to said films selected magnetizing fields substantially in parallel with the preferred axis of said first film, and sensing means for producing electrical signals in response to variations in the magnetic flux external to both of said films in a direction parallel with the preferred axis of said first film.

7. A memory device as set forth in claim 6 wherein the self-demagnetizing field of at least the first one of said two films exceeds the coercive force of that film.

8. A magnetic memory device comprising:

a first magnetic film exhibting a coercive force along at least one axis thereof and having a self-demagnetizing field large in comparison with said coercive force, a second magnetic film having a preferred axis of magnetization positioned in transverse relation to said first film axis, and also having a hard axis transverse to said preferred axis along which said second film exhibits an anisotropy field, said second film having a self-demagnetizing field smaller than the self-demagnetizing field of said first film, each of said films being positioned in the self-demagnetizing field of the other film with the anisotropy field of said second film being substantially equal to the difference between the self-demagnetizing fields of said films but not substantially greater than the coercive force of said first film, and electrical input-output means inductively coupled to said films including energizing means for applying to said films selected magnetizing fields substantially parallel to said first film axis, and sensing means inductively coupled to said films so as to be linked by at least some of the magnetic flux external to said films along said transverse axis of said second film.

9. A memory device as set forth in claim 8 wherein the self-demagnetizing field of at least the first of said films exceeds the coercive force of that film.

10. A magnetic memory device comprising:

a first magnetic film having a coercive force along a given axis thereof and having sufficient thickness so that its self-demagnetizing field along said axis is at least equal to a large portion of its coercive force, said first film having a first stable state of extreme remanent magnetization along said axis and a second stable state of at least partial demagnetization, a second magnetic film having a preferred easy axis of magnetization and transverse thereto a saturable hard axis of magnetization with negligible remanence, said second film having sufficient thickness so that its self-demagnetizing field is at least equal to a major portion of its coercive force and being arranged with its hard axis in the self-demagnetizing field of said first film thereby to provide a saturable portion of the return path for the remanent flux of said first film, sensing means inductively related to said films in such a manner as to be linked by at least a portion of the return flux external to said films, and electrical energizing means associated with said films including means for selectively placing said first film alternatively its first stable state to represent a first binary digit and in its second stable state to represent a second binary digit, said energizing means also including means for applying a magnetic field to said films along said given axis to induce an output signal in said sensing means according to the resulting variation, if any, in the magnetic flux linking said sensing means.

11. A magnetic memory device comprising:

a first magnetic film having a coercive force along a given axis thereof and having sufficient thickness so that its self-demagnetizing field along said axis is at least equal to a large portion of its coercive force, said first film having a first stable state of extreme remanent magnetization along said axis and a second stable state of at least partial demagnetization, a second magnetic film having a preferred easy axis of magnetization and transverse thereto a saturable hard axis of magnetization with negligible remanence, said second film having sufficient thickness so that its self-demagnetizing field is at least equal to a major portion of its coercive force and being arranged so that it can be saturated along its hard axis by the self-demagnetizing return flux of said first film when said first film is in its first stable state, sensing means inductively related to said films in such a manner as to be linked by at least a portion of the return flux external to said films, and electrical energizing means associated with said films including means for selectively placing said first film alternatively in its first stable state to represent a first binary digit or in its second stable state to represent a second binary digit, said energizing means also including means for applying a magnetic field to said films along said given axis to induce an output signal in said sensing means according to the resulting variaion, if any, in the magnetic flux linking said sensing means.

12. A magnetic memory device comprising:

a magnetic storage film having a coercive force along a given axis thereof and having sufficient thickness so that its self-demagnetizing field along said axis is at least equal to a large portion of its coercive force, said first film having a first stable state of extreme remanent magnetization along said axis representing a first binary digit and a second stable state of at least partial demagnetization representing a second binary digit, a magnetic read film adjoining said storage film having a preferred easy axis of magnetization and transverse thereto a saturable hard axis of magnetization with negligible remanence, said second film having sufficient thickness so that its self-demagnetizing field is at least equal to a major portion of its coercive force and being arranged so that it can be saturated along its hard axis by the self-demagnetizing return flux of said first film when said first film is in its first stable state, sensing means inductively related to said films in such a manner as to be linked by at least a portion of the return flux external to said films, an electrical energizing means associated with said films including means for selectively placing said first film alternatively in its first stable state or in its second stable state, said energizing means also including nondestructive readout means for applying momentarily to said read film along its hard axis a magnetizing field insufficient to change the stable state of said storage film but sufficient to vary the net flux linking said sensing means when said storage film is in its second stable state, thereby to produce in said sensing means an output signal indicative of said second binary digit.

13. A magnetic memory device comprising:
a first magnetic film having a coercive force along at least one given axis thereof and having a self-demagnetizing field at least equal to a large portion of its coercive force,
a second magnetic film having an easy axis of magnetization along which it exhibits a coercive force and having a transverse hard axis of magnetization along which it exhibits substantially no coercive force and an anisotropy field no greater than the coercive force of said first film, said second magnetic film also having a self-demagnetizing field at least equal to a large portion of its coercive force but smaller than the self-demagnetizing field of said first film,
said films being magnetically coupled to each other with the hard axis of said second film being substantially parallel to said first film axis, the difference between the self-demagnetizing fields of said films being large in comparison with the anisotropy field of said second film but not substantially larger than the coercive force of said first film.
sensing means inductively coupled to said films in such a manner as to be linked by at least a portion of the external magnetic flux of said films in a direction substantially parallel with the hard axis of said second film,
and electrical energizing means inductively coupled to said films for selectively placing said first film in any of the following states:
a stable state of substantially maximum remanent magnetization representing a first binary digit, or
a stable state of at least partial demagnetization representing a second binary digit, or
a state of varying magnetization which causes a variation in the external flux linking said sensing means, thereby to produce an output signal representing at least one of said binary digits.

14. A memory device as set forth in claim 13 wherein the self-demagnetizing field of at least the first one of said two films substantially exceeds the coercive force of that film.

15. A magnetic memory comprising:
an array of magnetic memory devices arranged in intersecting rows and columns, each of said memory devices including:
a first magnetic film having a coercive force along at least one given axis thereof and having a self-demagnetizing field at least equal to a large portion of its coercive force,
a second magnetic film having an easy axis of magnetization and having a hard axis of magnetization along which it exhibits substantially no coercive force but does exhibit a substantial anisotropy field not exceeding the coercive force of said first film, said second film also having a self-demagnetizing field smaller than the self-demagnetizing field of said first film,
said films being magnetically coupled to each other, with the hard axis of said second film being substantially parallel to said first film axis, the difference between the self-demagnetizing fields of said films not exceeding the coercive force of said first film,
a set of generally parallel column conductors each inductively coupled to the memory devices of a respective column and each selectively energizable for applying to each of the memory devices in its respective column a magnetic field substantially paralleling the hard axis of said second film thereof,
a set of generally parallel row conductors each inductively coupled to the memory devices of a respective row and each selectively energizable for applying to each of the memory devices of its respective row a magnetic field substantially paralleling the hard axis of said second film thereof, each of said row conductors also being linked by at least a portion of the magnetic flux external to the films of each memory device in its row for producing a signal voltage in response to a variation of such external flux,
electrical energizing means including:
column energizing means for selectively furnishing energizing currents to said column conductors,
and row energizing means for selectively furnishing energizing currents to said row conductors,
said column and row energizing means being adapted to furnish coincident currents to selected ones of said column and row conductors for thereby causing the memory device located at each intersection of an energized column conductor and a coincidentally energized row conductor to be in a stable state represented by substantially a maximum remanent magnetization of its first film,
said column energizing means being adapted also to furnish other currents to selected ones of said column conductors for causing each of the memory devices of any selected column to be in a stable state represented by at least partial demagnetization of its first and second films, and being further adapted to energize any selected one of said column conductors in a manner such as to vary the external magnetic flux of each memory device in its respective column accordingly,
and sensing means responsive to the signal voltages produced in said row conductors by variations in the magnetic flux linked therewith.

16. A memory as set forth in claim 15 wherein said column energizing means is adapted to supply said column conductors selectively with nondestructive read current pulses of such value that the resulting variations in the external magnetic flux of the memory devices in that column are not of a magnitude sufficient to produce substantial changes in the stable states of those devices.

17. A memory as set forth in claim 15 wherein at least the first of the magnetic films in each of said memory devices has a self-demagnetizing field exceeding its respective coercive force.

18. A magnetic memory comprising:
an array of magnetic memory devices arranged in intersecting rows and columns, each of said memory devices including:
a first magnetic film having a coercive force along at least one given axis thereof and having a self-demagnetizing field at least equal to a large portion of its coercive force,
a second magnetic film having an easy axis of magnetization along which it exhibits a coercive force and having a hard axis of magnetization along which it exhibits substantially no coercive force but does exhibit a substantial anisotropy field not exceeding the coercive force of said first film, said second film also having a self-demagnetizing field at least equal to a large portion of its coercive force but smaller than the self-demagnetizing field of said first film,
said films being magnetically coupled to each other with the hard axis of said second film being substantially parallel to said first film axis, the difference between the self-demagnetizing fields of said films not exceeding the coercive force of said first film,
a set of generally parallel column conductors each inductively coupled to the memory devices of a respective column and each selectively energizable for applying to each of the memory devices in its respective column a magnetic field substantially paralleling the hard axis of said second film thereof, a set of generally parallel row conductors each inductively coupled to the memory devices of a respective row and each selectively energizable for applying to each of the memory devices of its respective row a magnetic field substantially paralleling the hard axis of said second film thereof, electrical energizing means including:

column energizing means for selectively furnishing energizing currents to said column conductors, and row energizing means for selectively furnishing energizing currents to said row conductors, said column and row energizing means being adapted to furnish coincident currents to selected ones of said column and row conductors for thereby causing the memory device located at each intersection of an energized column conductor and a coincidentally energized row conductor to be in a stable state represented by substantially a maximum remanent magnetization of its first film, said column energizing means being adapted also to furnish other currents to selected ones of said column conductors for causing each of the memory devices of any selected column to be in a stable state represented by at least partial demagnetization of its first and second films, and being further adapted to energize any selected one of said column conductors in a manner such as to vary the external magnetic flux of each memory device in its respective column accordingly, and sensing means responsive to variations in the external magnetic flux of said memory devices produced by said column energizing means.

19. In a magnetic memory device, a first saturable magnetic film having an axis along which it exhibits a coercive force and being of such thickness that its self-demagnetizing field is a large portion of the field required to magnetize said first film to saturation, said first film being adapted to assume any of a plurality of stable quiescent states including a state of at least partial demagnetization, a second saturable magnetic film having an axis along which it exhibits substantially no coercive force and being of such thickness that its self-demagnetizing field is a large portion of the field required to magnetize said second film to saturation, said films being arranged in superposed relationship with their said axes substantially parallel and with each film affording a path for a substantial portion of the self-demagnetizing flux from the other film, the self-demagnetizing field of said second film being substantially smaller than the self-demagnetizing field of said first film, whereby said second film is adapted to be magnetically biased by said first film when said films are in magnetized states, electrical energizing means inductively coupled to said films for applying thereto selected magnetizing fields each substantially parallel with said axes thereby to place said first film in selected ones of its stable states including said state of at least partial demagnetization, said energizing means also including means for at least momentarily varying the magnetic flux of said second film when said first film is in a demagnetized or partially demagnetized state, and electrical sensing means arranged to be linked by at least some of the external magnetic flux of said films for producing significant output voltages in response to significant variations of such flux.

20. A memory device as set forth in claim 19 wherein the self-demagnetizing field of said first film exceeds the coercive force of that film.

References Cited

UNITED STATES PATENTS 3,298,005 1/1967 Matick ............ 340—174

TERRELL W. FEARS, *Primary Examiner.*

GARY M. HOFFMAN, *Assistant Examiner.*